(12) United States Patent
Sailhan et al.

(10) Patent No.: US 8,391,296 B2
(45) Date of Patent: Mar. 5, 2013

(54) METHOD OF PROCESSING EVENT NOTIFICATIONS AND EVENT SUBSCRIPTIONS

(75) Inventors: Françoise Sailhan, Paris (FR); Paddy Farrell, County Offaly (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 117 days.

(21) Appl. No.: 12/665,714

(22) PCT Filed: Jun. 29, 2007

(86) PCT No.: PCT/EP2007/056606
§ 371 (c)(1),
(2), (4) Date: Jul. 4, 2010

(87) PCT Pub. No.: WO2009/003513
PCT Pub. Date: Jan. 8, 2009

(65) Prior Publication Data
US 2010/0278184 A1    Nov. 4, 2010

(51) Int. Cl.
*H04L 12/28* (2006.01)
*H04L 12/56* (2006.01)
(52) U.S. Cl. ............... 370/400; 370/255; 370/256
(58) Field of Classification Search ............ 370/338, 370/254–258, 328, 229–235, 400–411
See application file for complete search history.

(56) References Cited

U.S. PATENT DOCUMENTS

| | | | |
|---|---|---|---|
| 7,184,421 B1 * | 2/2007 | Liu et al. | 370/338 |
| 7,904,551 B2 * | 3/2011 | Revanuru | 709/224 |
| 7,978,631 B1 * | 7/2011 | Abdelaziz et al. | 370/255 |
| 2005/0086469 A1 * | 4/2005 | Dunagan et al. | 713/163 |
| 2005/0097569 A1 | 5/2005 | Chandrasekaran | |
| 2006/0067337 A1 * | 3/2006 | Netravali et al. | 370/400 |
| 2008/0270531 A1 * | 10/2008 | Revanuru | 709/203 |
| 2010/0042668 A1 * | 2/2010 | Liang et al. | 709/201 |

OTHER PUBLICATIONS

PCT International Search Report, dated Apr. 3, 2008, in connection with International Application No. PCT/EP2007/056606.
Anceaume, E. et al. "A Semantic Overlay for Self-Peer-to-Peer Publish/Subscribe" Distributed Computing Systems, 2006, ICDCS 2006. 26th IEEE International Conference on Lisboa, Portugal Jul. 4-7, 2006, Piscataway, NJ, USA, IEEE. p. 22, XP010927327, ISBN: 0-7695-2540-7.
Ge, Zihui et al. "Matchmaker: signaling for dynamic publish/subscribe applications" Network Protocols, 2003. Proceedings. 11th IEEE International Conference on Nov. 4-7, 2003, pp. 222-233, XP010671576, ISBN: 0-7695-2024-3.
"UTRA-UTRAN Long Term Evolution (LTE) and 3GPP System Architecture Evolution (SAE)" Third Generation Partnership Project, http://www.3gpp.org, updated Oct. 4, 2006.

(Continued)

*Primary Examiner* — Chuong T Ho
(74) *Attorney, Agent, or Firm* — Potomac Patent Group PLLC

(57) ABSTRACT

A method of processing event subscriptions in a telecommunications or data network comprising a plurality of nodes organized in clusters, in multiple layers. Each cluster has a cluster leader. The method comprises maintaining by each node a routing table comprising a list of nodes in its cluster and a repository of event subscriptions; forwarding an ascending subscription by a node to all nodes within its cluster and to its cluster's leader; forwarding a descending subscription to all nodes of all layers that the node is a leader and adding a received event subscription to the event subscriptions repository and associating said subscription with a node, which forwarded it.

18 Claims, 5 Drawing Sheets

OTHER PUBLICATIONS

Castro, M. et al. "Scribe: A large-scale and decentralized application-level multicast infrastructure" IEEE Journal on Selected Areas in Communications, vol. 20, No. 8, pp. 100-110, Oct. 2002.

Banerjee, S. et al. "Scalable Application Layer Multicast" SIGCOMM 2002, Aug. 19-23, 2002, Pittsburgh, Pennsylvania, USA, ACM 1-58113-570-X/02/0008.

Pietzuch, P. et al. "Hermes: a distributed event based middleware architecture" Proceedings of 22nd International Conference on Distributed Computing Systems Workshops, pp. 611-618, Feb. 2002, ISBN: 0-7685-1588-61n.

* cited by examiner

METHOD OF PROCESSING EVENT NOTIFICATIONS AND EVENT SUBSCRIPTIONS

TECHNICAL FIELD

The present invention relates to telecommunications and data networks, in general, and in particular to handling event notifications and event subscriptions in telecommunications and data networks.

BACKGROUND

Event notification is managed in prior art solutions in a centralized way, i.e. around one (or a few) managers that collect information related to the events generated by the network elements (NEs), which are under its supervision. This centralised management paradigm is characterised by the concentration of the application processing and the traffic on a single network application whereas a collection of agents is limited to the role of dumb event collector. Due to the increase in the network size, there is a tendency to alleviate the load from a central management station by delegating some of the work load to agents, as counseled by the 3GPP long term evolution process. These agents are software entities that are run on remote NEs and perform tasks relating to event handling on behalf of the central manager.

A popular way of handling event notification lies in relying on the publish/subscribe paradigm in which consumers express their monitoring demands to producers during a subscription process and, in response to that subscription, the producers transfer to the subscribers notifications of events, which have been triggered locally.

From a communication point of view, a distributed publish/subscribe event notification system consists of exchanging notifications and control messages (i.e., subscriptions and un-subscriptions) between producers and subscribers through a collection of intermediate event routers.

When considering distributed event delivery, one can distinguish three main issues. First one that has to be resolved is the organisation (configuration and management) of the event delivery structure in the sense that the configuration and controlling of the delivery structure should be performed automatically. The second issue relates to the creation of an event delivery structure which is well balanced so as to ensure that the number of hops necessary to deliver a notification is bounded. The third issue is to ensure a fast dissemination of the event notifications over this structure.

Existing solutions to the above problem do not provide an adequate support to the above issues. Centralised, hierarchical or multicast-based event notification systems that are available assume that a network administrator configures statically their delivery structure. Such assumption prevents the system from being deployed over large-scale networks spanning sites distributed over large geographical area. In addition, the multicast-based event notification systems suffer from limited and sparse deployment of multicast protocols which is due to a combination of technical (complex billing, management and security concerns) and non technical reasons.

Other known solutions, like, for example, Distributed Hash Tables (DHT) event notification systems, exhibit self-deployment capabilities. However, their fully distributed delivery structure cannot be controlled or constrained with regards to some criteria (e.g., geographical position of group members, bandwidth availability, and role) which are relevant for aggregating or correlating notifications and hence improve the performance of the event system.

Hence, an improved method of processing event notifications and event subscriptions would be advantageous and in particular one that provides efficient structure of delivery event notifications, which keeps the number of messages exchanged to a minimum and which automatically reacts to changes in the network and changes in the demands of the event consumers.

SUMMARY

Accordingly, the invention seeks to preferably mitigate, alleviate or eliminate one or more of the disadvantages mentioned above singly or in any combination.

The collection of intermediate nodes (or event routers) is organised dynamically into a cluster-based structure in multiple layers (also called an overlay) in which each cluster has a cluster leader (a cluster leader is also an event router) is responsible for maintaining the information concerning the cluster members under its responsibility and the connections with other routers. This underlying cluster-based structure is used for delivering control messages (subscriptions and un-subscriptions) to producers, as well as notifications to consumers.

According to a first aspect of the present invention there is provided a method of processing event subscriptions in a telecommunications or data network, which comprise a plurality of nodes organised in clusters, in multiple layers. Each cluster has a cluster leader. The method comprises maintaining by each node a routing table comprising a list of nodes in its cluster and a repository of event subscriptions. The node forwards an ascending subscription to all nodes within its cluster including its cluster's leader. Additionally said node forwards a descending subscription to all nodes at all layers that said node is a leader. The node adds a received event subscription to the event subscriptions repository and links said subscription with a node, which forwarded it.

Because the network is not static and requirements of various consumers of the event notifications change it is also necessary to efficiently handle un-subscriptions. Therefore, in order to reduce traffic, a node forwards a un-subscription to another node only if a corresponding subscription was forwarded to that node earlier.

Once a node produces an event said node sends to its cluster leader an event notification that corresponds to this event. Upon reception of an ascending event notification by the cluster leader said cluster leader forwards said ascending event notification to any node if a subscription for this event has been previously forwarded by said node to said cluster leader. If the cluster leader receives a descending event notification said cluster leader forwards said descending event notification to a node under its responsibility if a subscription for this event has been previously forwarded by said node to said cluster leader. This approach ensures that event notifications are sent only to nodes that wants these event notifications.

The invention allows for dynamically reconfiguring the cluster structure in the presence of network dynamics (e.g. node failures). In order to enable this reconfiguration a node in the network sends periodically to its cluster leader a message indicating that said node is operational. If the cluster leader does not detect said message for a predefined number of cycles said cluster leader concludes that said node is down and removes from its routing table a record related to the node that failed to send the message.

According to a second aspect of the present invention there is provided a telecommunications or data network comprising a plurality of nodes organised in clusters, in multiple layers. Each cluster comprises a cluster leader, wherein a node that is a member of a cluster comprises a routing table with a list of nodes in its cluster and a repository of event subscriptions. The node is adapted to forward an ascending subscription to all nodes within its cluster including its cluster's leader. Additionally said node is adapted to forward a descending subscription to all nodes in all layers that the node is a leader. Said node is further adapted to add a received event subscription to the event subscriptions repository and to link said subscription with a node, which forwarded it.

According to a third aspect of the present invention there is provided a node for a telecommunications or data network adapted to be organised with other nodes of the network in clusters, in multiple layers, wherein each cluster comprises a cluster leader. Said node comprises a routing table with a list of nodes in its cluster and a repository of event subscriptions. The node is adapted to forward an ascending subscription to all nodes within its cluster including its cluster's leader. Additionally said node is adapted to forward a descending subscription to all nodes in all layers that the node is a leader. Said node is further adapted to add a received event subscription to the event subscriptions repository and to link said subscription with a node, which forwarded it.

Further features of the present invention are as claimed in the dependent claims.

The presently proposed cluster-based publish/subscribe event system provides the benefit of decentralizing/distributing the workload associated with event handling to the agents as suggested by the 3GPP long term evolution process. In addition to the above, this event notification system addresses the main commitments of large-scale networks: scalability, autonomy, and fault-tolerance. More precisely, scalability is supported by a scalable group communication and event routing mechanism. Autonomy is the consequence of using a self-configured and managed grouping service that allows configuring and managing the delivery structure without requiring human intervention. The resulting delivery structure also reconfigures itself when confronted with a failure while providing a strict control of the delivery structure and offering potential aggregation and correlation points. Fault-tolerance is attributed to a loosely-distributed event delivery structure that adapts dynamically to any permanent or transient network failure.

Additional desirable features of the present invention include bounded number of layers and the cluster size of the event delivery structure. This has the advantage that a control overhead ranges about $\log(n_n)$ at each node. Additionally the cluster based structure allows dynamically reconfigure the grouping structure in the presence of network dynamics (e.g., node failures) as well as maintaining a balanced delivery structure which guarantees a bounded delivery delay in the range of $\log(n_n)$, with $n_n$ designating the number of nodes that are expected to join the group. The term delivery delay refers here to the delay necessary to deliver a message (event notification, subscription or un-subscription).

BRIEF DESCRIPTION OF THE DRAWINGS

The present invention will be understood and appreciated more fully from the following detailed description taken in conjunction with the drawings in which.

DETAILED DESCRIPTION

The term event router herein below refers to a network element, or network node, which aims to forward event subscriptions and event notifications that were issued by an event subscriber (or respectively an event producer). The term event router also refers to an event subscriber or en event producer. Some examples of event routers include radio base stations (RBS), mobile switching centres (MSC), base station controllers (BSC), Radio Network Controllers (RNC), IP Routers, and Gateway nodes (MGW).

The term ascending event subscription herein below refers to an event subscription conveyed to an upper-level event router or originating from the local event router.

The term descending event subscription herein below refers to an event subscription that is conveyed from a neighbour router on the same level or an upper level router.

The term ascending event notification herein below refers to an event notification conveyed to an upper-level event router or originating from the local event router.

The term descending event notification herein below refers to an event notification that is conveyed from a neighbour router on the same level or an upper level router.

The term local event router refers to an event router that decides upon receipt of an event whether the subscription or notification is ascending or descending.

Figure 1:
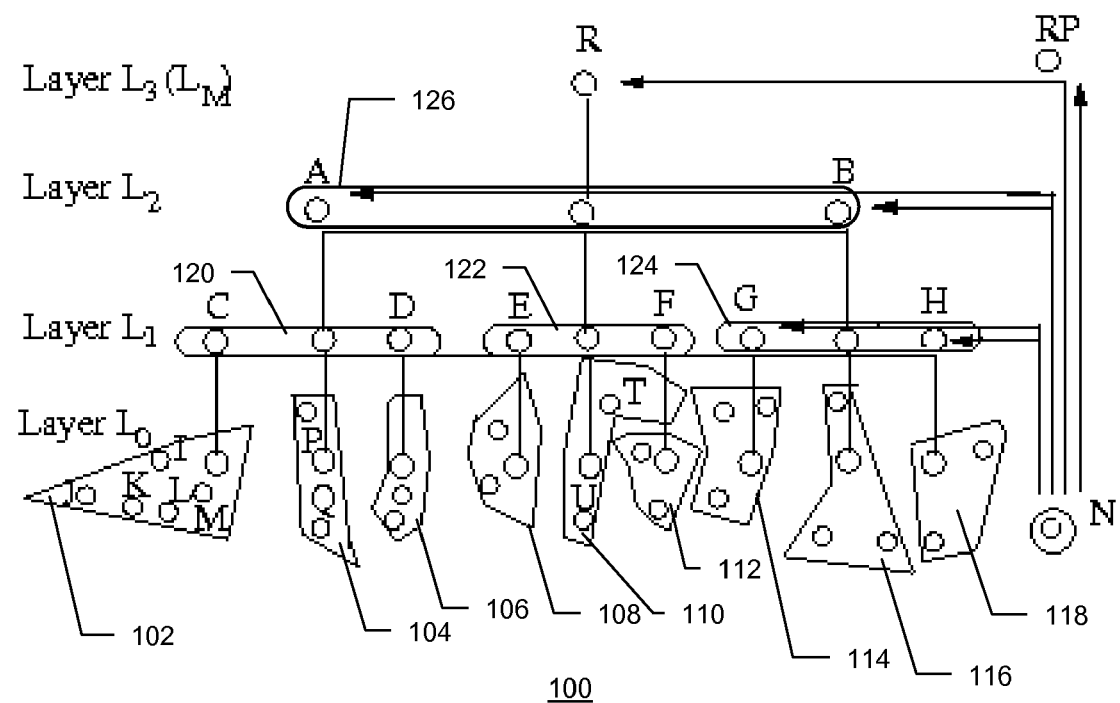
FIG. 1 is a diagram illustrating creation of a multi-layer cluster-based structure of network nodes.

With reference to FIG. 1 creation of a self-organised cluster-based hierarchy of $n_l$ layers $n_l = \log(n_n)$ is presented. The number of nodes that are expected to join the group is designated as $n_n$. Each layer in this hierarchy is portioned into a set of bounded-size clusters controlled by a cluster leader. The reason for setting bounds on the number of layers and on the cluster size is twofold. First, it ensures a control overhead ranging about $\log(n_n)$ at each node. Second, the length of the path used for delivering notifications, and hence the related delay, is bounded to be in the range of $\log(n_n)$. In practice, to warrant a loop-free structure, each node belongs to the lowest layer ($L_0$) and only the leader of a cluster located in a layer $L_i$ belongs to the upper layer $L_{i+1}$. In order to keep to a minimum the number of messages exchanged to maintain the group membership up-to-date, a node maintains information restricted to its cluster(s). Node C in FIG. 1 belongs to cluster 102 (layer $L_0$), but it is also a leader of the cluster 102 and therefore belongs to layer $L_1$, where it forms cluster 120 with nodes A and D from clusters 104 and 106. Therefore a node that is not a leader of any cluster maintains information about its cluster only and a node that is a leader of its cluster maintains information about its cluster in layer $L_0$ and any upper layer it belongs to.

Each member of a cluster sends periodically to its cluster leader a keep-alive message. Thus, a cluster leader may passively detect a node failure or initiate a cluster merge/split if the cluster size differs significantly from the desired bound.

The creation of the cluster-based structure is handled as follow; reference is being made here to FIG. 1. When a new node N wants to join the group, it contacts its Rendezvous Point (RP), which provides bootstrapping information relating to the group configuration (e.g., identity of the cluster leader R, number of layers and cluster's bounded-size, and the event system configuration). A Rendezvous Point is a network element or network node that acts as a meeting place for the network elements that are willing to handle event notification. From a practical perspective, the role of a rendezvous point is to provide bootstraping information (i.e. configuration parameters) to the nodes that want to handle notification. An example of configuration parameter is the identity of the node which is the root of the cluster hierarchy (i.e. cluster leader). To prevent creating a single source bottleneck, the RP does not provides additional functionalities. Next, with the bootstrapping information given by RP, N selects the closest cluster head, which in the case illustrated here is node B and refines progressively its selection at each layer so as to ultimately join the closest cluster in layer $L_0$ (i.e., H's cluster 118).

Event notification and control messages (subscriptions and un-subscriptions) are then routed on the top of the above overlay infrastructure. The main challenge in routing notifications and control messages (subscriptions and un-subscriptions) stems from the need to minimise the traffic generated and the computational load of the event routers. To minimise the traffic it is necessary that event notifications are forwarded to an event router only if, towards this direction, there exists a consumer interested in receiving them. Additionally, messages have to be duplicated as close as possible to their respective consumers, while notifications are filtered as close as possible to event producers. The number of control messages that are propagated in the network must be kept to a minimum.

For the purpose of forwarding selectively notifications, each event router holds a routing table that includes a list of the neighbouring event routers. Because a node (an event router) maintains information restricted to its cluster the routing table is restricted to event routers in the same cluster (with the exception of cluster leaders that are also members of clusters on upper layers). Therefore neighbouring event routers are always members of the same cluster. These neighbouring event routers constitute the potential candidates for forwarding event notifications. This routing table also contains a repository of the consumer's subscriptions. Each subscription in the repository is associated (or linked) with the neighbouring router, which forwarded it. This routing table is used to filter the notifications, i.e. to define if a consumer exists along the direction of the considered event router that subscribed for this notification and to select the router located in the direction of the consumer to which the notification is to be forwarded.

Subscription Routing

In order to reduce the subscription propagation, any router determines if a subscription should be forwarded or not, and if so, towards which neighbouring event router this subscription should be forwarded to.

In operation, a node forwards an ascending subscription to all nodes within its cluster including the cluster's leader. Otherwise, (i.e. when the subscription is descending) the subscription is forwarded to all neighbouring nodes of all layers that this node is a leader. When a new subscription is generated by a node (an originating node) this originating node sends said new subscription to all nodes within its cluster 202 and to the cluster's leader 204. Once an event router receives an event subscription it adds said received subscription to its event subscriptions repository and links said subscription with a node, which forwarded it.

Figure 2:
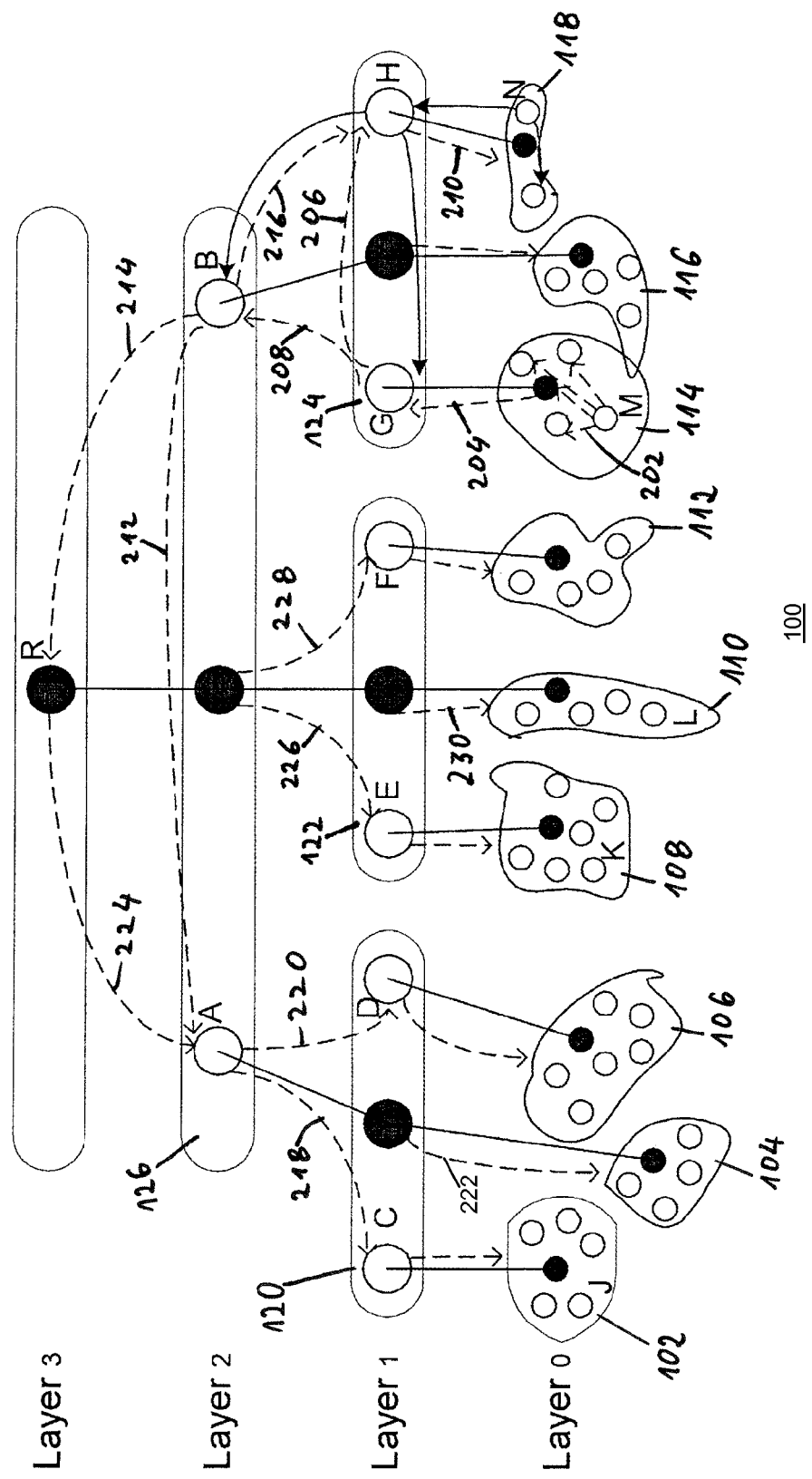
FIG. 2 is a diagram illustrating routing of event subscriptions in one embodiment of the present invention.

To clarify this decision making, the flow of subscriptions is illustrated in FIG. 2, where two consumers, M and N, declare their interests in receiving notifications for an event. For this illustration it is assumed that M and then N send identical subscriptions.

M belongs to level 0 and is not a cluster leader so it sends a subscription 202, 204 to its neighbours and its cluster leader G. Each neighbour of node M on level 0 that gets this subscription will add this to its own subscription table but not propagate any further as they do not have any descendants and they will know that the cluster head G will already have got this message.

Event router G as the leader of cluster 114 is also a member of cluster 124 on level $L_1$ and, as this is an ascending subscription, it forwards 206 the subscription to its neighbour in the cluster 124, i.e. node H and, 208, to its cluster leader B. When H receives this subscription it will not inform any of its neighbours because the message is not in the ascending direction but seen as descending (i.e. from a peer or a cluster leader) and H will send 210 the subscribe message to all its descendants on layer $L_0$. On receipt of the subscribe message node B will forward 212 the request to all its peers (node A in this case) and, 214, to its cluster leader—node R, because the message is ascending. Node B will also send, 216, the subscription to all its neighbours on all levels below the top level that it is in (i.e. Levels 1 & 0). Node B, however, will exclude the node it received the subscription from (i.e. node G).

From here on, the pattern is repeated, based on whether the request is ascending or descending. Event router A sends 218, 220, 222 the message down to its neighbours of all layers that it is a cluster leader, (i.e. all layers it is in except the top most one). Because node R does not have any neighbours in layer $L_3$ (R is the head of the entire tree) it sends 224-230 the subscription to all its neighbour nodes in all layers.

Lets assume that later node N sends a subscribe to all its neighbours and to its cluster leader H (it is required that the originating node sends the subscription request to all nodes within its cluster and to the cluster's leader). Node H forwards a subscribe message to its neighbours (i.e. node G), its cluster leader (i.e. node B) and all descendants excluding N. On receipt of this request node B will add node H to its subscription table, but will block the subscription form going any further as the subscription is already covered from here on. Subscription from node N is identical to the earlier subscription from node M and it was already distributed by node B. Therefore it is not necessary to distribute same subscription once again and it is blocked by node B. This allows limiting the number of control messages sent in the network.

Un-Subscription Routing

To minimise the number of un-subscriptions transmitted, and hence reduce the associated waste of bandwidth, a router forwards a un-subscription only if the related subscription were previously forwarded to that router. This process permits to block the propagation of un-subscriptions towards a direction in which there is no router concerned by it. The protocol followed is similar to the one taken for routing subscriptions.

Event Notification Routing

Figure 3:
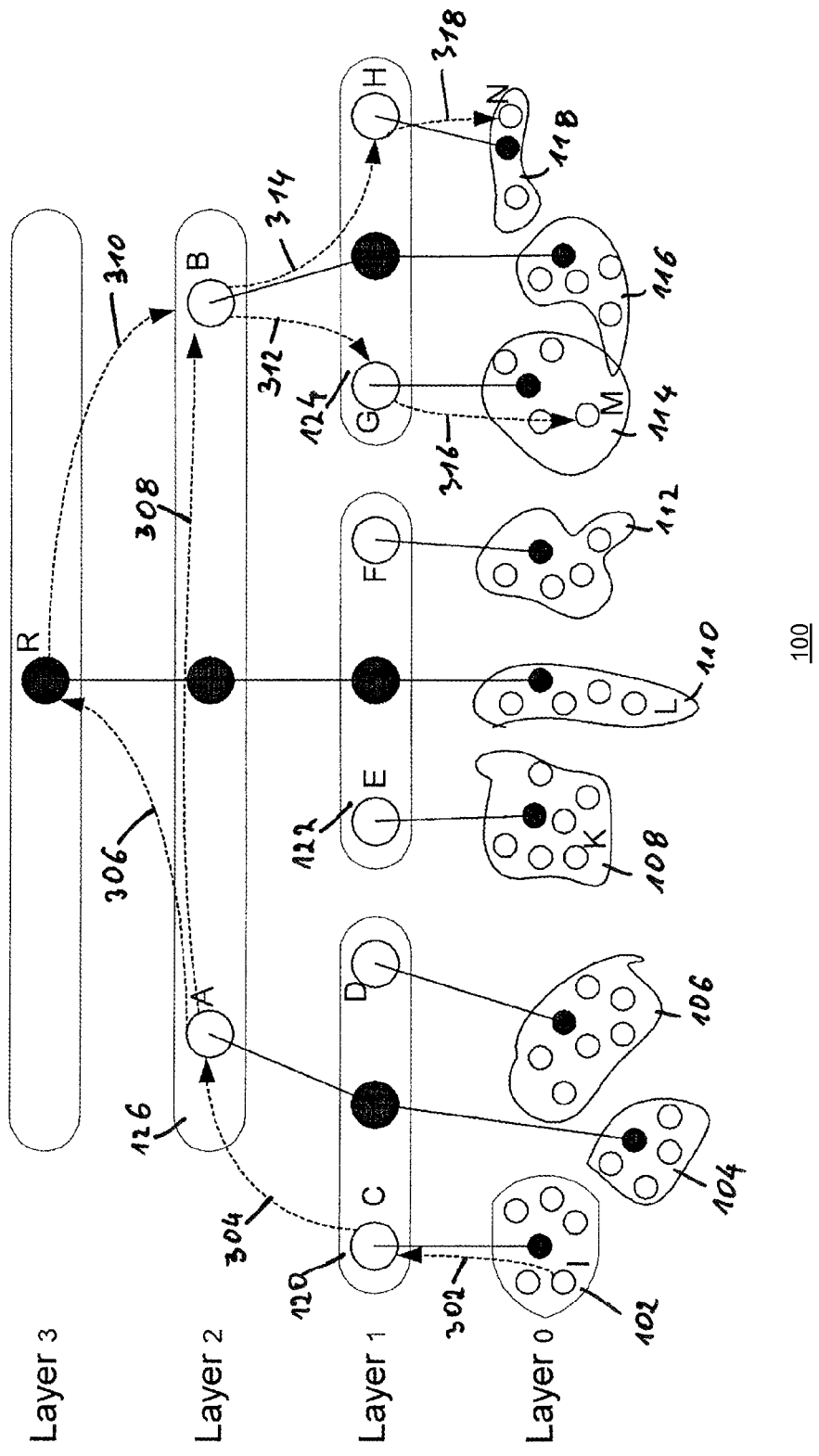
FIG. 3 is a diagram illustrating routing of event notifications in one embodiment of the present invention.
Figure 4:
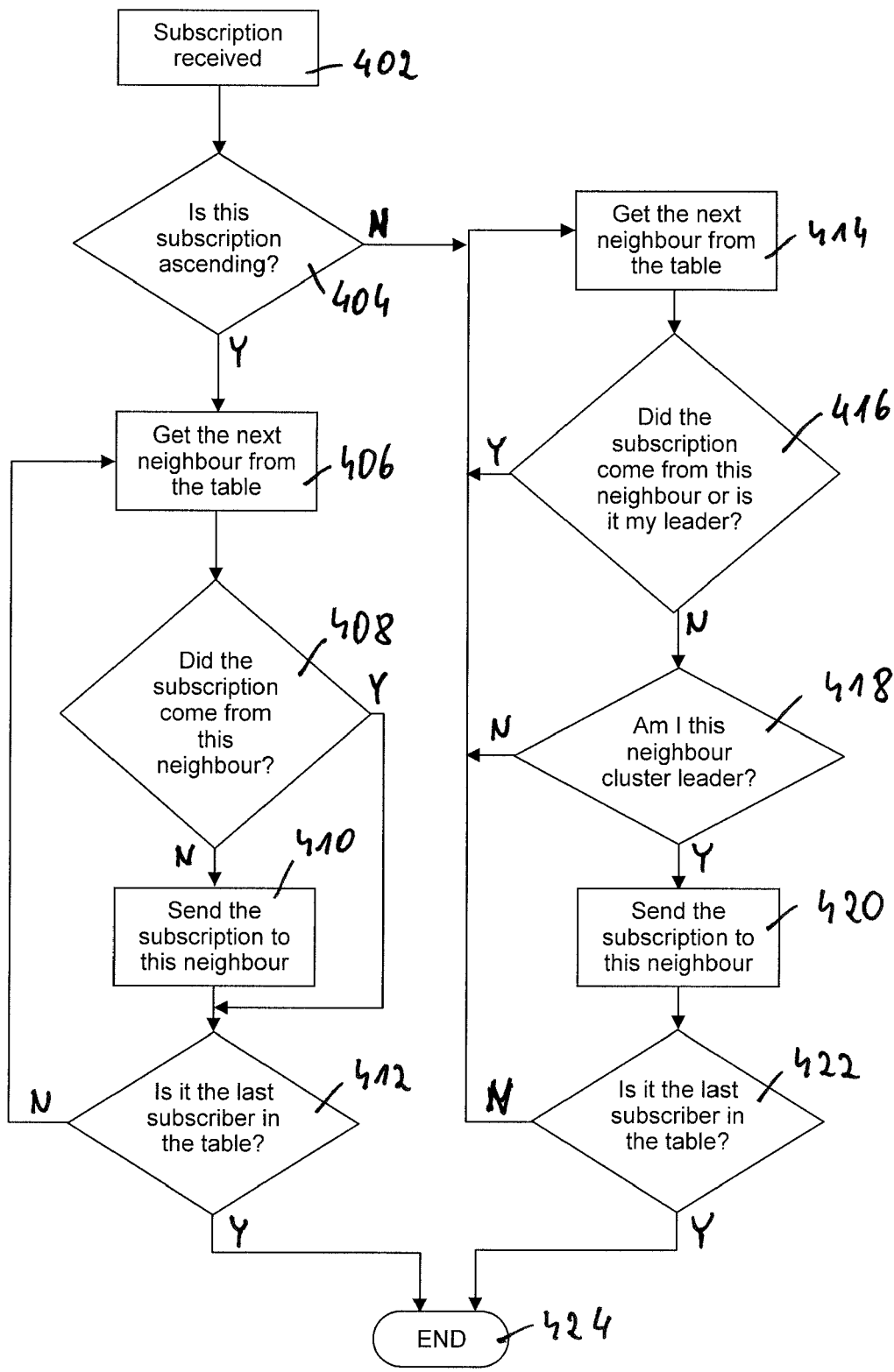
FIG. 4 is a diagram illustrating a method of processing of event subscriptions in one embodiment of the present invention.

With reference to FIG. 3 routing of event notifications in one embodiment of the present invention is presented. The most basic requirement is that an event producer always sends the event it generates to its cluster head.

Upon reception of an ascending event notification by the cluster leader said cluster leader forwards said ascending event notification to any node if a subscription for this event has been previously forwarded by said node to said cluster leader. In this way event notifications are not sent where they are not needed. Additionally, upon reception of a descending event notification, a cluster leader only forwards it to a node under its responsibility (i.e. a child) if a subscription for that event has been previously sent/forwarded by this node to that cluster leader. A notification is never sent to the event router it came from.

In operation, an event producer I generates a notification in which are interested two consumers—nodes G and H. Because I is the producer of the event it sends 302 the event notification to its cluster head C. On receipt of the notification node C propagates, 304, it to node A since a subscription that matches this event notification was previously issued by node A and the notification is ascending.

Node A forwards, 306, this notification to the cluster leader R because it previously subscribed for it, and similarly, 308, to node B. In the next step node R sends 310 the message to node B.

At this stage the message is descending, and node B forwards, 312, 314, it to nodes G and H because they have subscribed to it. Nodes G and H then send 316, 318 the message to all interested parties in all layers that they are cluster leaders, but they do not send the message to any of the interested parties of the top most layer that they are in (i.e. L1) because the message would have been already passed on by their cluster leader.

One other possible scenario is when a router E sends a notification to router F who was at one time interested but since then unsubscribed. This can happen if the router E was temporarily unavailable for the original un-subscription and did not see F's un-subscribe request. In this case F will re issue the un-subscribe to E as per the normal un-subscribe protocol.

The invention claimed is:

1. A method of processing event subscriptions in a telecommunications or data network comprising a plurality of nodes organised in clusters, in multiple layers, each cluster having a cluster leader, wherein the method comprises:
    maintaining by each node a routing table comprising a list of nodes in its cluster and a repository of event subscriptions;
    forwarding an ascending subscription by a node to all nodes within its cluster and to the cluster's leader;
    forwarding by the node a descending subscription to all nodes of all layers that the node is a leader; and
    adding a received event subscription to the event subscriptions repository and associating said subscription with a node, which forwarded it,
    wherein upon reception of an ascending event notification by the cluster leader the method further comprises forwarding said ascending event notification to any node if a subscription for this event has been previously forwarded by said node to said cluster leader.

2. The method according to claim 1, wherein an un-subscription is forwarded to a node only if a corresponding subscription was forwarded to that node earlier.

3. The method according to claim 1, wherein a node that produces an event sends a corresponding event notification to its cluster leader.

4. The method according to claim 1, wherein upon reception of a descending event notification by the cluster leader the method further comprises forwarding said descending event notification to a node under responsibility of said cluster leader if a subscription for this event has been previously forwarded by said node to said cluster leader.

5. The method according to claim 1, wherein a node in the network sends periodically a message indicating that its sender is operational and if the cluster leader does not detect said message for a predefined number of cycles said cluster leader removes from its routing table a record related to the node that failed to send the message.

6. A telecommunications or data network comprising: a plurality of nodes organised in clusters, in multiple layers, each cluster having a cluster leader, wherein a node that is a member of a cluster comprises a routing table with a list of nodes in its cluster and a repository of event subscriptions; the node is adapted to forward an ascending subscription to all nodes within its cluster and to its cluster's leader and to forward a descending subscription to all nodes of all layers this node is a leader; said node is further adapted to add a received event subscription to the event subscriptions repository and to associate said subscription with a node, which forwarded it,
    wherein upon reception of an ascending event notification by a cluster leader said cluster leader is adapted to forward said ascending notification to any node if a subscription for this event has been previously forwarded by said node to said cluster leader.

7. The network according to claim 6, wherein the node is adapted to forward an un-subscription to a second node only if a corresponding subscription was forwarded to the second node earlier.

8. The network according to claim 6, wherein a node that produces an event is adapted to send a corresponding event notification to its cluster leader.

9. The network according to claim 6, wherein upon reception of a descending event notification by a cluster leader said cluster leader is adapted to forward said descending notification to a node under its responsibility if a subscription for this event has been previously forwarded by said node to said cluster leader.

10. The network according to claim 6, wherein the nodes in the network are adapted to send periodically a message indicating that its sender is operational and if the cluster leader does not detect said message for a predefined number of cycles said cluster leader is adapted to remove from its routing table a record related to the node that failed to send the message.

11. A node for a telecommunications or data network adapted to be organised with other nodes of the network in clusters, in multiple layers, each cluster having a cluster leader, wherein said node comprises: a routing table with a list of nodes in its cluster and a repository of event subscriptions; the node is adapted to forward an ascending subscription to all nodes within its cluster and to its cluster's leader and to forward a descending subscription to all nodes of all layers this node is a leader; said node is further adapted to add a received event subscription to the event subscriptions repository and to associate said subscription with a node, which forwarded it,
    wherein if said node is a cluster leader then upon reception of an ascending event notification said cluster leader is adapted to forward said ascending notification to any node if a subscription for this event has been previously forwarded by said node to said cluster leader.

12. The node according to claim 11, wherein said node is adapted to forward an un-subscription to a second node only if a corresponding subscription was forwarded to the second node earlier.

13. The node according to claim 11, wherein if said node produces an event said node is adapted to send a corresponding event notification to its cluster leader.

14. The node according to claim 11, wherein if said node is a cluster leader then upon reception of a descending event notification said cluster leader is adapted to forward said descending notification to a node under its responsibility if a subscription for this event has been previously forwarded by said node to said cluster leader.

15. The node according to claim 11, adapted to send periodically a message indicating that said node is operational.

16. The node according to claim 15, wherein if the node is a cluster leader and if said cluster leader does not detect said message for a predefined number of cycles said cluster leader is adapted to remove from its routing table a record related to the node that failed to send the message.

17. A node for a telecommunications or data network adapted to be organised with other nodes of the network in clusters, in multiple layers, each cluster having a cluster leader, wherein said node comprises: a routing table with a list of nodes in its cluster and a repository of event subscriptions; the node is adapted to forward an ascending subscription to all nodes within its cluster and to its cluster's leader and to forward a descending subscription to all nodes of all layers this node is a leader; said node is further adapted to add a received event subscription to the event subscriptions repository and to associate said subscription with a node, which forwarded it, wherein if said node is a cluster leader then upon reception of a descending event notification said cluster leader is adapted to forward said descending notification to a node under its responsibility if a subscription for this event has been previously forwarded by said node to said cluster leader.

18. A node for a telecommunications or data network adapted to be organised with other nodes of the network in clusters, in multiple layers, each cluster having a cluster leader, wherein said node comprises: a routing table with a list of nodes in its cluster and a repository of event subscriptions; the node is adapted to forward an ascending subscription to all nodes within its cluster and to its cluster's leader and to forward a descending subscription to all nodes of all layers this node is a leader; said node is further adapted to add a received event subscription to the event subscriptions repository and to associate said subscription with a node, which forwarded it, wherein the node is adapted to send periodically a message indicating that said node is operational, and wherein if the node is a cluster leader and if said cluster leader does not detect said message for a predefined number of cycles said cluster leader is adapted to remove from its routing table a record related to the node that failed to send the message.

* * * * *

UNITED STATES PATENT AND TRADEMARK OFFICE
CERTIFICATE OF CORRECTION

| | | |
|---|---|---|
| PATENT NO. | : 8,391,296 B2 | |
| APPLICATION NO. | : 12/665714 | |
| DATED | : March 5, 2013 | |
| INVENTOR(S) | : Sailhan et al. | |

Figure 5:
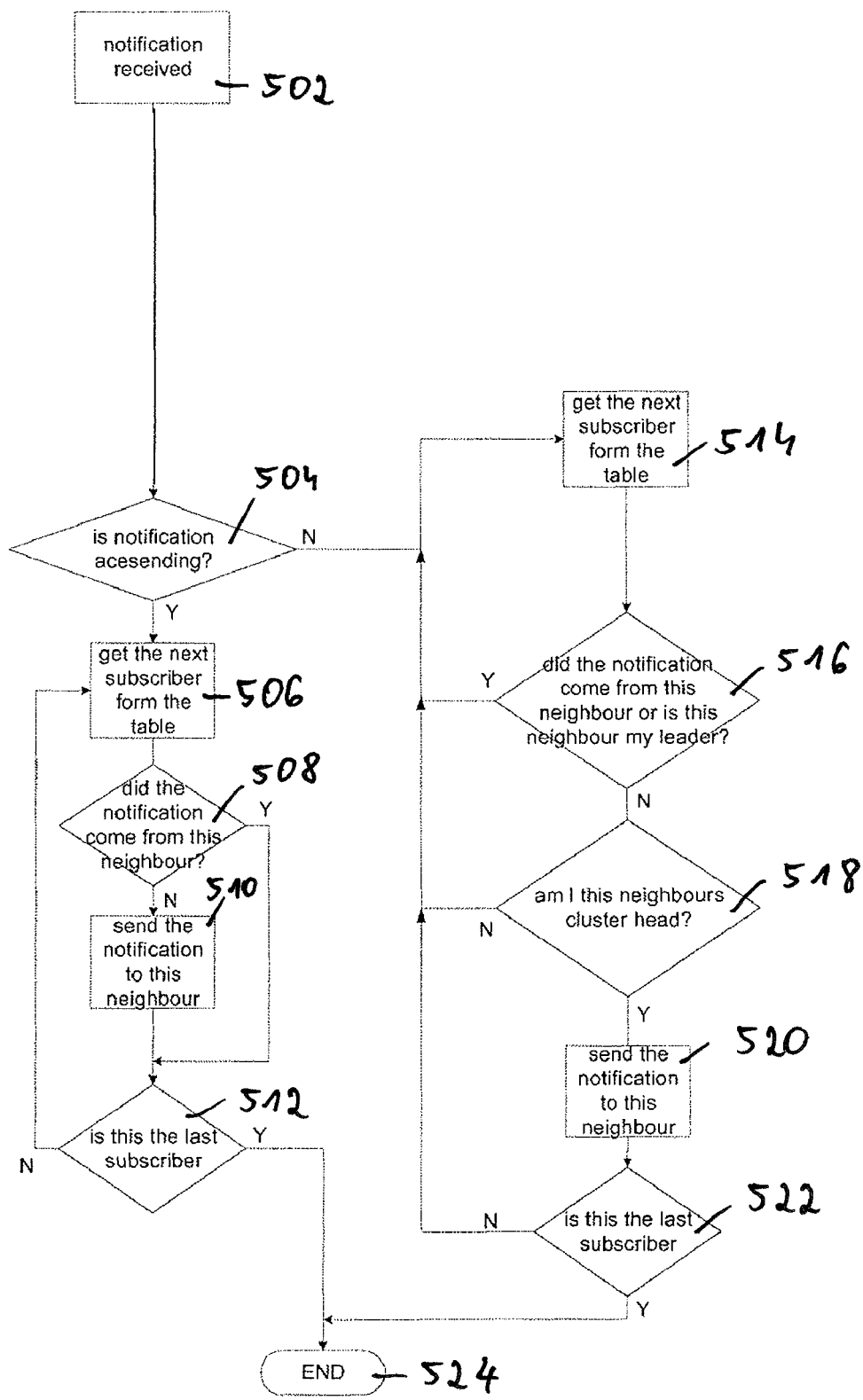
FIG. 5 is a diagram illustrating a method of processing of event notifications in one embodiment of the present invention.

It is certified that error appears in the above-identified patent and that said Letters Patent is hereby corrected as shown below:

In the Drawings:

In Fig. 5, Sheet 5 of 5, for Tag "504", in Line 2, delete "acesending?" and insert -- ascending? --, therefor.

In Fig. 5, Sheet 5 of 5, for Tag "506", in Line 3, delete "form" and insert -- from --, therefor.

In Fig. 5, Sheet 5 of 5, for Tag "514", in Line 3, delete "form" and insert -- from --, therefor.

In the Specifications:

In Column 1, Line 25, delete "counseled" and insert -- counselled --, therefor.

In Column 4, Lines 6-7, delete "invention;" and insert -- invention; and --, therefor.

Signed and Sealed this
Thirteenth Day of August, 2013

Teresa Stanek Rea
*Acting Director of the United States Patent and Trademark Office*